United States Patent
Ohara

(10) Patent No.: US 10,230,896 B2
(45) Date of Patent: Mar. 12, 2019

(54) ACCESSORY FOR CAMERA AND STORAGE MEDIUM STORING DISPLAY CONTROL PROGRAM

(71) Applicant: CANON KABUSHIKI KAISHA, Tokyo (JP)

(72) Inventor: Toru Ohara, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/084,981

(22) Filed: Mar. 30, 2016

(65) Prior Publication Data

US 2016/0295121 A1    Oct. 6, 2016

(30) Foreign Application Priority Data

Apr. 3, 2015   (JP) .................................. 2015-076830
Feb. 23, 2016  (JP) .................................. 2016-032171

(51) Int. Cl.
*H04N 5/232* (2006.01)
*G03B 17/56* (2006.01)

(52) U.S. Cl.
CPC ....... *H04N 5/23245* (2013.01); *G03B 17/568* (2013.01); *H04N 5/23241* (2013.01); *G03B 2217/18* (2013.01)

(58) Field of Classification Search
CPC ................................................... G03B 17/568
See application file for complete search history.

(56) References Cited

U.S. PATENT DOCUMENTS

| | | | | |
|---|---|---|---|---|
| 5,122,880 A * | 6/1992 | Nagano | ................. | G02B 7/102 348/211.2 |
| 6,041,195 A * | 3/2000 | Honda | ................. | G03B 17/48 348/64 |
| 6,091,450 A * | 7/2000 | Hirasawa | ........... | H04N 5/23241 348/211.2 |
| 7,885,537 B1* | 2/2011 | Kuss | ................. | H04N 5/23293 348/333.06 |
| 8,305,476 B2* | 11/2012 | Nakai | ...................... | G03B 7/26 348/222.1 |
| 9,602,723 B2* | 3/2017 | Suzuki | ............... | H04N 5/23241 |

(Continued)

FOREIGN PATENT DOCUMENTS

| JP | 2003250069 A | 9/2003 |
|---|---|---|
| JP | 2007072407 A | 3/2007 |

(Continued)

OTHER PUBLICATIONS

Office Action Issued in Japanese Appln. No. 2016-032171 dated Jun. 5, 2018. English Translation provided.

*Primary Examiner* — Cynthia Segura
(74) *Attorney, Agent, or Firm* — Rossi, Kimms & McDowell LLP

(57) ABSTRACT

The accessory is detachably attachable to a camera in which multiple image capturing modes are settable. The accessory includes a display element configured to electrically display information, and a display controller configured to perform a display control for controlling turning on and off of display of the information on the display element. The display controller is configured to perform the display control depending on the image capturing mode set in the camera or on a type of the camera to which the accessory is attached.

23 Claims, 6 Drawing Sheets

(56) References Cited

U.S. PATENT DOCUMENTS

| | | | | |
|---|---|---|---|---|
| 9,749,530 B2* | 8/2017 | Saito | | H04N 5/23241 |
| 9,894,277 B2* | 2/2018 | Ozawa | | H04N 5/23254 |
| 2007/0153112 A1* | 7/2007 | Ueda | | G03B 19/12 |
| | | | | 348/335 |
| 2008/0036895 A1* | 2/2008 | Kosaka | | H04N 5/23245 |
| | | | | 348/333.01 |
| 2009/0284643 A1* | 11/2009 | Shibuno | | G03B 13/00 |
| | | | | 348/347 |
| 2010/0066888 A1* | 3/2010 | Nakai | | G03B 7/26 |
| | | | | 348/333.01 |
| 2011/0098083 A1* | 4/2011 | Lablans | | G03B 35/00 |
| | | | | 455/556.1 |
| 2013/0055001 A1* | 2/2013 | Jeong | | G06F 1/3228 |
| | | | | 713/323 |
| 2013/0064533 A1* | 3/2013 | Nakata | | G03B 3/10 |
| | | | | 396/76 |
| 2013/0093937 A1* | 4/2013 | Kawai | | H04N 5/23212 |
| | | | | 348/345 |
| 2013/0135509 A1* | 5/2013 | Fuji | | H04N 5/23241 |
| | | | | 348/333.02 |
| 2014/0168448 A1* | 6/2014 | Ozawa | | H04N 5/23216 |
| | | | | 348/170 |
| 2014/0189384 A1* | 7/2014 | Decherf | | G06F 1/3209 |
| | | | | 713/310 |
| 2014/0218599 A1* | 8/2014 | Nakamura | | H04N 5/23241 |
| | | | | 348/372 |
| 2016/0034019 A1* | 2/2016 | Seo | | G06F 1/3265 |
| | | | | 345/593 |
| 2016/0100105 A1* | 4/2016 | Saito | | H04N 5/23241 |
| | | | | 348/360 |
| 2016/0105613 A1* | 4/2016 | Takanashi | | H04N 5/23209 |
| | | | | 348/333.02 |
| 2016/0156799 A1* | 6/2016 | Ninomiya | | H04N 1/00896 |
| | | | | 358/1.13 |
| 2016/0360107 A1* | 12/2016 | Nabeshima | | H04N 5/23241 |
| 2017/0324902 A1* | 11/2017 | Saito | | H04N 5/23241 |
| 2018/0275593 A1* | 9/2018 | Ishikura | | G03G 15/80 |

FOREIGN PATENT DOCUMENTS

| | | |
|---|---|---|
| JP | 2007184912 A | 7/2007 |
| JP | 2011071570 A | 4/2011 |

* cited by examiner

ACCESSORY FOR CAMERA AND STORAGE MEDIUM STORING DISPLAY CONTROL PROGRAM

BACKGROUND OF THE INVENTION

Field of the Invention

The present invention relates to an accessory such as an interchangeable lens that is detachably attachable to digital cameras, and particularly to an accessory having a function of displaying information on image capturing.

Description of the Related Art

Interchangeable lenses include one provided with a display element such as an LCD panel that electrically displays information on an image capturing distance (object distance), a focal length, an aperture value, a depth of field and others. Japanese Patent Laid-Open No. 2007-072407 discloses an interchangeable lens having on its lens barrel a display element such as an electronic paper and displaying thereon information on one of an object distance, a focal length and others selected by operations of a setting switch provided in a camera. In general, such a display element provided in the interchangeable lens starts display of the information in response to turning on of a power switch of a camera and ends the display in response to turning off of the power switch.

However, most digital cameras to which interchangeable lenses are attachable have various selectable (settable) image capturing modes. Digital single-lens reflex cameras have an image capturing mode for performing still image capturing using an optical viewfinder, an image capturing mode for performing still image capturing while displaying a live view image on an electronic monitor provided on a back face of the camera, an image capturing mode for performing moving image capturing and others. Furthermore, an interchangeable lens attachable to the digital single-lens reflex camera is attachable also to a digital mirror-less camera having no optical viewfinder.

In a case where the interchangeable lens is attached to the camera having the selectable image capturing modes or the cameras of different types as described above, switching on and off of the display of the information on the display element in the interchangeable lens in response to the turning on and off of the power switch of the camera wastes electric power.

BRIEF SUMMARY OF THE INVENTION

The present invention provides an accessory capable of appropriately controlling turning on and off of display of information on a display element depending on an image capturing mode set in a camera and thereby capable of saving electric power. The present invention further provides a camera to which the above accessory is detachably attachable.

The present invention provides as an aspect thereof an accessory detachably attachable to a camera in which multiple image capturing modes are settable. The accessory includes a display element configured to electrically display information, and a display controller configured to perform a display control for controlling turning on and off of display of the information on the display element. The display controller is configured to perform the display control depending on the image capturing mode set in the camera.

The present invention provides as another aspect thereof an accessory detachably attachable to a camera. The accessory includes a display element configured to electrically display information, and a display controller configured to perform a display control for controlling turning on and off of display of the information on the display element. The display controller is configured to perform the display control depending on a type of the camera.

The present invention provides as yet another aspect thereof an accessory detachably attachable to a camera. The accessory includes a display element configured to electrically display information, and a display controller configured to perform a display control for controlling turning on and off of display of the information on the display element. The display controller is configured to turn off the display of the information on the display element in response to elapse of a predetermined time after receipt of notice from the camera indicating that the camera is switched from an image capturing mode enabling image capturing to a non-image capturing mode disabling image capturing.

The present invention provides as still another aspect thereof a non-transitory computer-readable storage medium storing a display control program as a computer program for controlling each of the above accessories.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
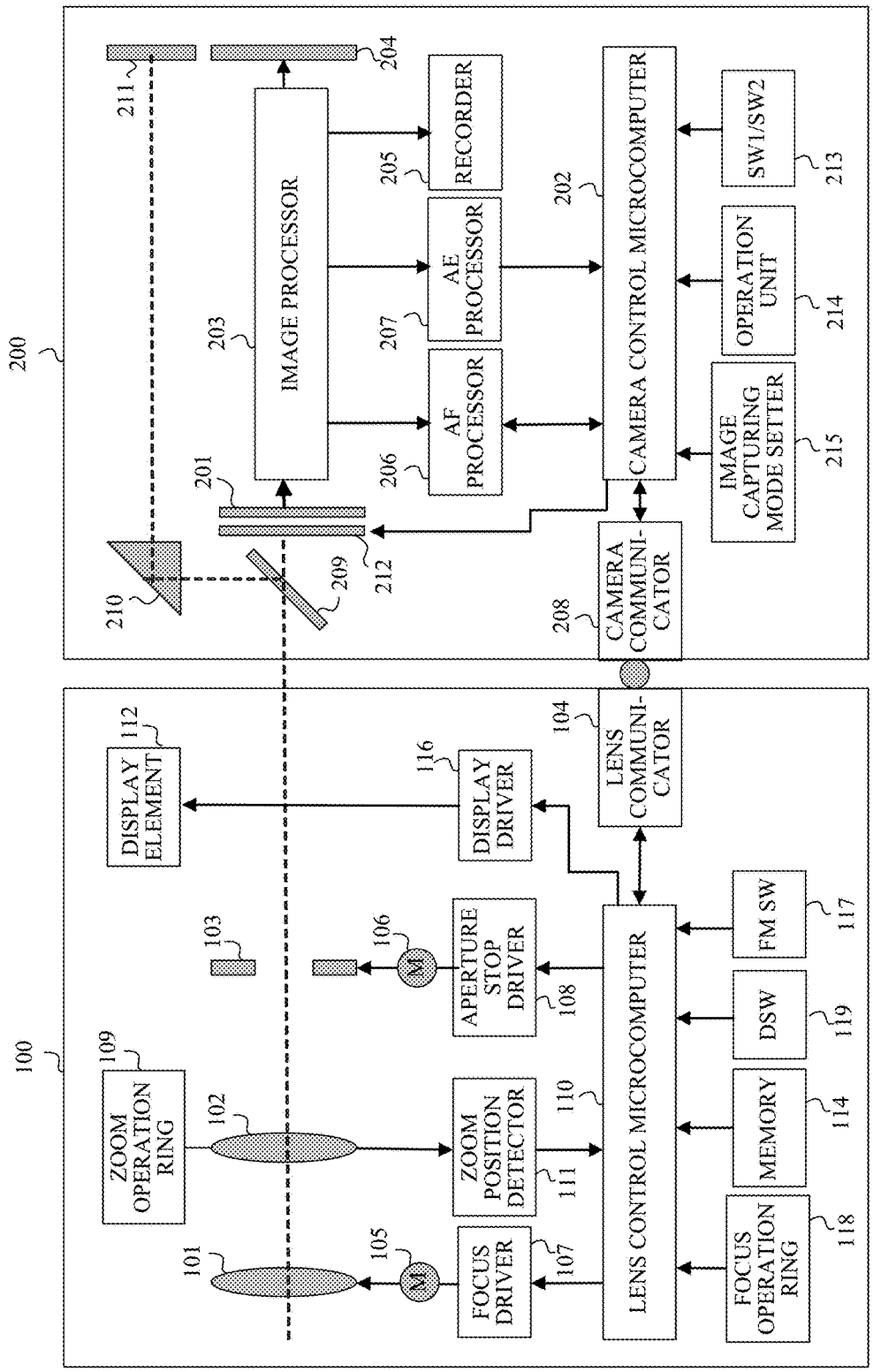
FIG. 1 is a block diagram illustrating a configuration of a lens-interchangeable camera system including an interchangeable lens that is Embodiment 1 of the present invention.

FIG. 1 illustrates a lens-interchangeable camera system including an interchangeable lens 100 that is a first embodiment (Embodiment 1) of the present invention and a camera body (hereinafter referred to simply as "a camera") 200 to which the interchangeable lens 100 as an accessory is detachably attached.

The interchangeable lens 100 and the camera 200 are coupled with each other at their mounts, and power supply pins and communication pins provided in these mounts are respectively connected with each other. This connection enables power supply from the camera 200 to the interchangeable lens 100 and bidirectional communication therebetween. Specifically, a lens control microcomputer (hereinafter referred to simply as "a lens microcomputer") 110 and a camera control microcomputer (hereinafter referred to simply as "a camera microcomputer) 202 mutually communicates various information.

The interchangeable lens 100 is provided with an image capturing optical system that images light from an object on an image sensor 201 provided in the camera 200. The image capturing optical system is housed in a lens barrel of the interchangeable lens 100. The image capturing optical system includes a focus lens 101 that moves in an optical axis direction of the image capturing optical system to perform focusing on the object, a magnification-varying lens 102 that moves in the optical axis direction to change a focal length of the image capturing optical system and an aperture stop 103 that control an amount of the light passing therethrough.

The lens microcomputer 110 is connected to a lens communicator 104 that enables the communication with the camera microcomputer 202. The lens microcomputer 110 controls, through a focus driver 107 and an aperture stop driver 108, a focus motor 105 that moves the focus lens 101 and an aperture stop motor 106 that drives the aperture stop 103. The focus motor 105 and the aperture stop motor 106 may each be, for example, a stepping motor. When the stepping motor is used, counting a number of drive pulse signals applied to the stepping motor after a movement of the focus lens 101 or the aperture stop 103, which is a driven member, to an initial position enables detecting a position of the driven member. Other actuators than the stepping motor may be used with a position detector that detects the position of the driven member.

A zoom operation ring 109 is a lens operation member to be rotationally operated by a user (operator) in order to move the magnification-varying lens 102 in the optical axis direction. A rotation of the zoom operation ring 109 is transmitted through a transmission mechanism to the magnification-varying lens 102 to move this lens 102 in the optical axis direction, and thereby manual zooming is performed. The position of the magnification-varying lens 102 (hereinafter referred to as "a zoom position") is detected by a zoom position detector 111 constituted by a potentiometer, and a signal from the zoom position detector 111 indicating the detected zoom position is input to the lens microcomputer 110. A memory 114 holds data on a correspondence relation between the zoom position and the focal length of the image capturing optical system. The lens microcomputer 110 can acquire from the data held in the memory 114 the focal length corresponding to the detected zoom position.

Furthermore, the memory 114 holds data on a correspondence relation between the position of the focus lens 101 (hereinafter referred to as "a focus position") and an object distance. The lens microcomputer 110 can acquire from the data held in the memory 114 the object distance corresponding to the detected focus position.

The memory 114 further holds data on a correspondence relation between the aperture stop position of the aperture stop 103 and an F-number (aperture value). The lens microcomputer 110 can acquire from the data held in the memory 114 the F-number corresponding to the detected aperture stop position. In addition, the lens microcomputer 110 can acquire a depth of field of the image capturing optical system through a calculation using the acquired F-number, focal length and object distance and a diameter of a permissible circle of confusion.

At a position, which is visible for the user, on an outer circumferential surface of the lens barrel of the interchangeable lens 100, a display element 112 such as an LCD (Liquid Crystal Display) or an organic EL (Electro-Luminescent) display that electrically displays information is disposed.

The lens microcomputer 110 controls the display element 112 through a display driver 116 to cause the display element 112 to display the information (hereinafter referred to also as "display information") on the focal length, the object distance, the depth of field and others. The lens microcomputer 110 further performs a display control for controlling turning on and off of display of the display information on the display element 112. The lens microcomputer 110 performs, as the display control, mutually different controls depending on an image capturing mode set in the camera 200.

Furthermore, the lens microcomputer 110 changes, in response to operations of a display switch (DSW) 119 provided near the display element 112 on the lens barrel, contents (kinds, classifications or the like) of the display information displayed on the display element 112. Various display symbols including icons displayable on the display element 112 by the lens microcomputer 110 are prestored in the memory 114.

On the outer circumferential surface of the lens barrel, a focus mode selecting switch (FMSW) 117 is provided that is slidably operable for switching a focus mode between an AF (autofocus) mode and an MF (manual focus) mode. Moreover, on the outer circumferential surface of the lens barrel, a focus operation ring 118 is disposed that is another lens operation member and is rotatably operable by the user. A rotation of the focus operation ring 118 is detected through a photo sensor such as a photo interrupter (PI) provided in the lens barrel. The lens microcomputer 110 reads, in the MF mode, two phase digital pulse signals output from the photo sensor with the rotation of the focus operation ring 118 to detect a direction and an amount of the rotation thereof. The lens microcomputer 110 drives the focus lens 101 depending on the detected rotation direction and amount.

In the camera 200, the image sensor 201 converts an object image formed by the image capturing optical system into an analog electric signal (image capture signal). The analog image capture signal output from the image sensor 201 is sent to an image processor 203 and converted thereby into a digital image capture signal. The image processor 203 performs, on the digital image capture signal, various image processes such as brightness adjustment, image scaling, white balance adjustment and color adjustment to produce a video signal. The video signal is displayed as a video (moving image) on a backside monitor (electronic monitor) 204 such as an LCD provided on a back face of the camera 200 and is recorded through a recorder 205 to a recording medium such as a semiconductor memory, a hard disk or an optical disk. The video signal from the image processor 203 is sent also to an AF processor 206 and an AE (autoexposure) processor 207.

The AF processor 206 extracts a high frequency component from the video signal to produce an AF evaluation value signal indicating a contrast state (that is, a focus state) of the video signal. The camera microcomputer 202 produces, on a basis of the AF evaluation value signal, an AF command signal for controlling the drive of the focus lens 101 in the interchangeable lens 100 and sends the AF command signal through a camera communicator 208 and the lens communicator 104 to the lens microcomputer 110.

The AE processor 207 extracts a luminance component from the video signal to produce an AE evaluation value signal indicating an over exposure and an under exposure. The camera microcomputer 202 produces, on a basis of the AE evaluation value signal, an aperture stop command signal for controlling the position of the aperture stop 203 (that is, the F-number) in the interchangeable lens 100 and sends the aperture stop command signal through the camera communicator 208 and the lens communicator 104 to the lens microcomputer 110.

The camera microcomputer 202 controls operations of the entire camera 200 in addition to the above-described AF and AE controls. The camera microcomputer 202 receives, from the lens microcomputer 110 through the camera communicator 208 and the lens communicator 104, lens information on a state of the interchangeable lens 100 such as a current focus position, a current zoom position and a current F-number. The camera microcomputer 202 produces, by using the lens information and the signals obtained from the AF processor 206, AE processor 207 and image processor 203, control information for controlling each lens and sends the control information through the camera communicator 208 and the lens communicator 104 to the lens microcomputer 110. The lens microcomputer 110 performs a control of each lens on a basis of the received control information.

In the camera 200, a mirror 209 is provided that is insertable into and retractable from an optical path from the image capturing optical system to the image sensor 201. The mirror 209 inserted into the optical path reflects the light (object image) from the image capturing optical system to introduce the reflected light through a penta prism 210 to an eye-piece lens 211. The mirror 209 inserted into the optical path, the penta prism 210 and the eye-piece lens 211 constitute an optical viewfinder, which enables the user to observe the object image through the eye-piece lens 211.

When an exposure of the image sensor 201, that is, image capturing for acquiring an image to be recorded is performed, the mirror 209 retracts outside the optical path. In this mirror retracted state, the light from the image capturing optical system proceeds toward the image sensor 201. In front of the image sensor 201, a focal-plane shutter 212 is disposed that opens and shuts its aperture to control an image capture time (exposure time) during which the image sensor 201 is exposed. The camera microcomputer 202 controls insertion and retraction operations of the mirror 209 and open and shut operations of the focal-plane shutter 212.

The camera 200 is provided with an image capturing switch 213 including a first switch SW1 to be operated by the user in order to instruct start of an image capturing preparation operation and a second switch SW2 to be operated by the user in order to instruct start of image capturing. The camera 200 is further provided with an operation unit 214 including various operation members such as buttons and switches operated by the user in order to perform various setting relating to image capturing. The camera 200 is yet further provided with an image capturing mode setter 215 enabling the user, through a touch operating UI (User Interface) on the backside monitor 204, to set (select) one image capturing mode.

The camera 200 in this embodiment has multiple image capturing modes including a viewfinder still image capturing mode (first image capturing mode; hereinafter referred to as "a VF still image capturing mode") for performing still image capturing using the optical viewfinder and a live view still image capturing mode (one of second image capturing modes; hereinafter referred to as "an LV still image capturing mode") for performing still image capturing using the backside monitor 204. The VF still image capturing mode is a mode for performing still image capturing while allowing the user to observe the object through the optical viewfinder. The LV still image capturing mode is a mode for performing still image capturing while allowing the user to observe the object through a video, that is, a live view image displayed in the backside monitor 204.

The camera 200 in this embodiment further has, as another one of the multiple image capturing modes, a moving image capturing mode (another one of the second image capturing modes) for performing moving image (video) capturing. The moving image capturing mode is a mode for performing moving image capturing while allowing the user to observe the object through the live view image or a video under recording displayed in the backside monitor 204.

The camera microcomputer 202 sends information on the image capturing mode set (selected) in the camera 200 to the lens microcomputer 110.

Next, with referring to a flowchart of FIG. 2, description will be made of a display control process performed by the lens microcomputer 110 for optimizing a display time (display duration) of the display element 112. The lens microcomputer 110 executes this process according to a display control program as a computer program.

In response to the connection of the above-described power supply pins and communication pins provided in the mounts of the camera 200 and the interchangeable lens 100 attached thereto, the lens microcomputer 110 starts at step (hereinafter abbreviated as "S") 201 communication with the camera microcomputer 202.

Next, at S202, the lens microcomputer 110 receives the information on the set image capturing mode sent from the camera microcomputer 202. The lens microcomputer 110 thereby determines which one of the VF still image capturing mode, the LV still image capturing mode and the moving image capturing mode is the set image capturing mode.

Next, at S203, the lens microcomputer 110 waits until receipt of a display trigger from the camera microcomputer 202; the display trigger serves as a trigger for starting display of the display information including the focal length, the object distance, the depth of field and others on the display element 112.

The display trigger in the VF still image capturing mode is, for example, a lens drive communication command 1 (hereinafter referred to simply as "a command S1") that is notice indicating start of the image capturing preparation operation including AF. The display trigger may be a lens drive communication command 2 (hereinafter referred to simply as "a command S2") that is notice indicating start of the exposure time of the image sensor 201 (that is, start of still image capturing). The command S1 is produced by the camera microcomputer 202 in response to the operation of the first switch SW1 in the image capturing switch 213 and sent to the lens microcomputer 110. The command S2 is produced by the camera microcomputer 202 in response to the operation of the second switch SW2 in the image capturing switch 213 and sent to the lens microcomputer 110

The display trigger in the VF still image capturing mode may be notice indicating that the display switch 119 has been operated to select the content of the display information displayed on the display element 112. The lens microcomputer 110 having received the display trigger proceeds to S204. The process at step S202 to determine the set image capturing mode and the process at S203 to wait for the receipt of the display trigger may be inversely performed.

The display triggers in the LV still image capturing mode and the moving image capturing mode are respectively, for example, notice indicating setting of the LV still image capturing mode in the camera 200 and notice indicating setting of the moving image capturing mode therein.

At S204, the lens microcomputer 110 determines whether or not the set image capturing mode received from the camera microcomputer 202 at S202 is the VF still image capturing mode. If the set image capturing mode is the VF still image capturing mode, the lens microcomputer 110 proceeds to S205 to perform, as the display control, a first control described later, and otherwise (if the set image capturing mode is the LV still image capturing mode or the moving image capturing mode) proceeds to S208.

The lens microcomputer 110 proceeding to S205 and S208 has already received the display trigger at S203, so that the lens microcomputer 110 performs from these steps respectively, as display controls in addition to the first control and a second control described later, a display control (including a third control and a fourth control) to start the display of the display information on the display element 112.

The lens microcomputer 110 proceeding to S205 performs at S205 to S207 a display control as the first control to stop (turn off) the display of the display information on the display element 112 in response to elapse of a predetermined time (first predetermined time) from the start of the display of the display information. The first predetermined time will be described later.

The lens microcomputer 110 starts at S205 and S208 counting of an elapsed time from the start of the display of the display information on the display element 112. When the set image capturing mode is the VF still image capturing mode (S205), the lens microcomputer 110 stops the display of the display information on the display element 112 in response to receipt of notice indicating that the camera 200 is powered off and in response to receipt of a power-save mode transition command instructing transition to a power-save mode. That is, regardless of whether or not the first predetermined time from the start of the display of the display information has elapsed, the lens microcomputer 110 stops the display of the display information in response to the receipt of the notice indicating the power off of the camera 200 and in response to the receipt of the power-save mode transition command.

The power off of the camera 200 corresponds to an off operation of a power switch included in the camera 200. The power-save mode transition command is sent from the camera microcomputer 202 to the lens microcomputer 110. The lens microcomputer 110 causes the interchangeable lens 100, in response to the receipt of this power-save mode transition command, to transition to the power-save mode. The power-save mode in the interchangeable lens 100 is a mode for reducing power consumption as compared to its active mode. The lens microcomputer 110 that transitions to the power-save mode stops the display of the display information.

The lens microcomputer 110 having determined at S205 that the first predetermined time from the start of the display of the display information on the display element 112 has elapsed determines at S206 whether or not a display extension trigger is produced while the display information is displayed. If the display extension trigger is produced, the lens microcomputer 110 resets the elapsed time to 0 and then restarts the counting of the elapsed time. If the display extension trigger is not produced, the lens microcomputer 110 proceeds to S207 to stop (turn off) the display of the display information.

The display extension trigger is produced in response to, for example, receipt of the command 1 or the command 2 from the camera 200 or receipt of the notice indicating that the display switch 119 has been operated. Furthermore, the display extension trigger is produced in response to, for example, receipt of notice indicating that the zoom operation ring 109 or the focus operation ring 118 has been operated or receipt of notice indicating that the set image capturing mode has been switched in the camera 200 to the LV still image capturing mode or the moving image capturing mode.

Figure 2:
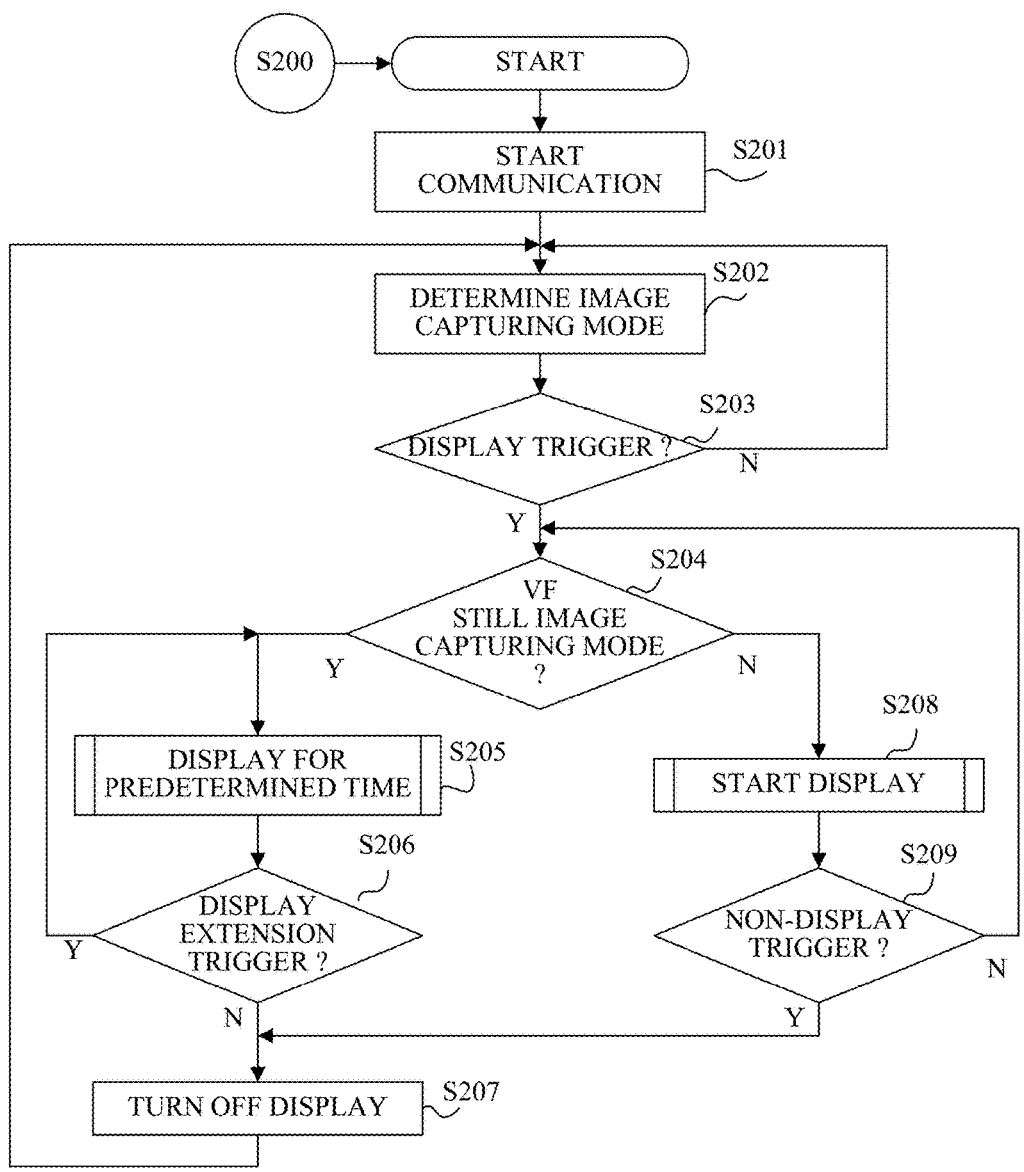
FIG. 2 is a flowchart of a display control process performed in the interchangeable lens of Embodiment 1.

Although the flowchart of FIG. 2 illustrates that the determination at S206 is made after the elapse of the first predetermined time from the start of the display of the display information at S205, the determination at S206 may be successively performed while the display information is displayed. For example, in a case where the elapsed time is reset in response to the production of the display extension trigger before the elapse of the first predetermined time, the lens microcomputer 110 may stop the display of the display information in response to reaching of a newly counted elapsed time to the first predetermined time.

Thus, when the set image capturing mode is the camera 200 is the VF still image capturing mode, the lens microcomputer 110 performs the above-described first control.

Figure 4:
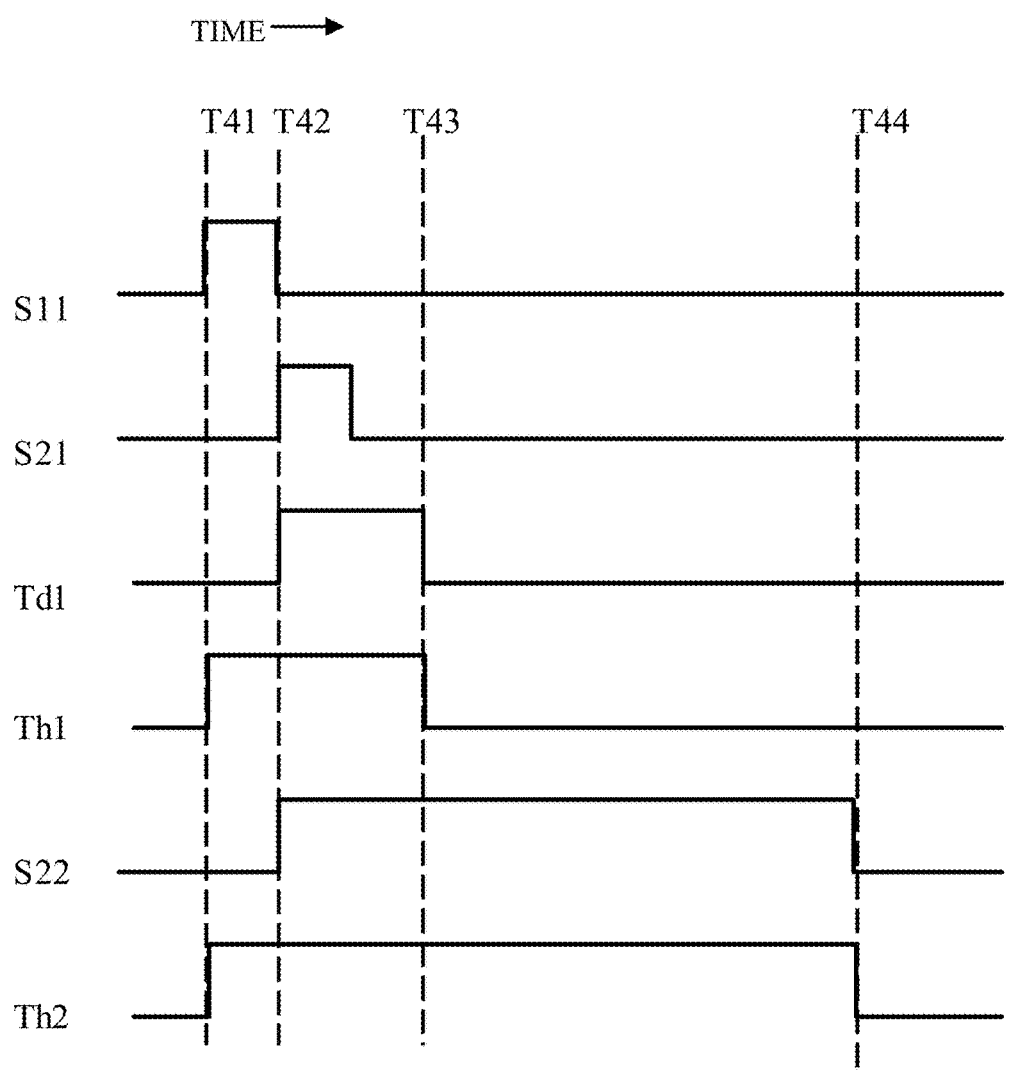
FIG. 4 is a display control timing chart in the interchangeable lens of Embodiment 1.
Figure 5:
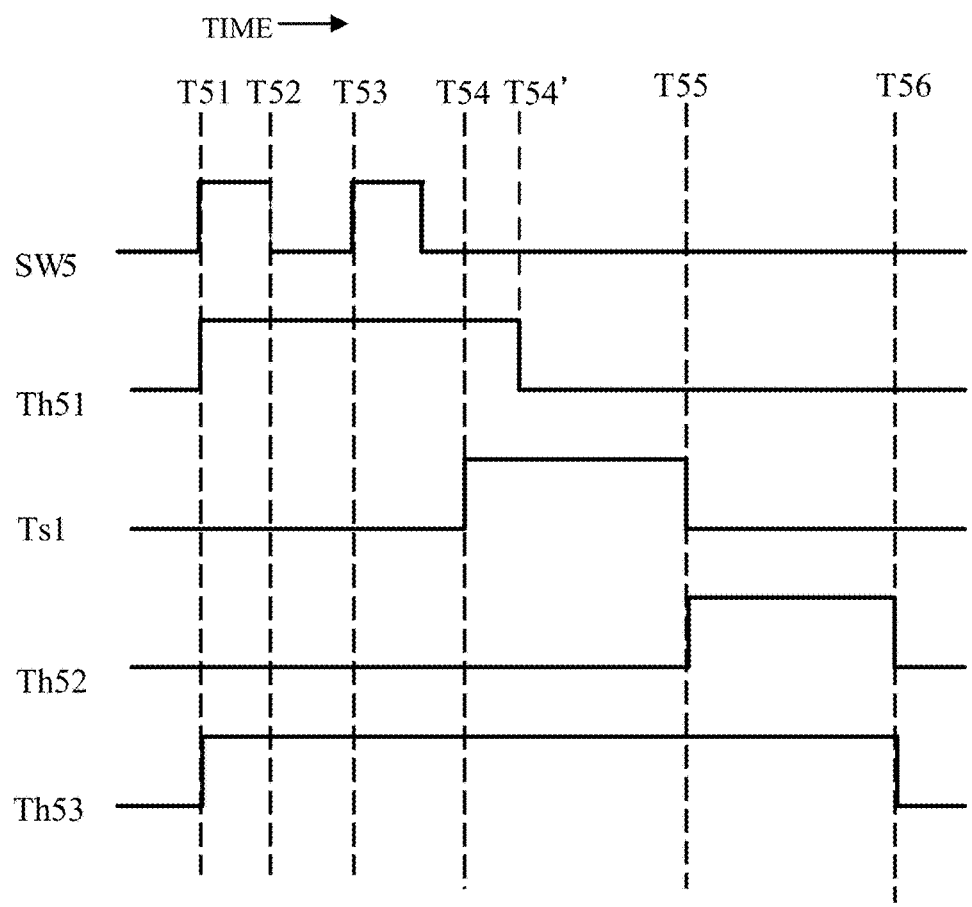
FIG. 5 is another display control timing chart in the interchangeable lens of Embodiment 1.

FIGS. 4 and 5 illustrate timing charts of the display control process for the display element 112 performed by the lens microcomputer 110 having determined that the set image capturing mode in the camera 200 is the VF still image capturing mode. FIG. 4 illustrates a timing chart in a case where the display control process for the display element 112 is performed in a period of time from the operation of the first switch SW1 in the image capturing switch 213 provided in the camera 200 to an end of image capturing (that is, an end of an exposure of the image sensor 201).

S11 represents an image capturing preparation time (T41 to T42) that is a period of time for the image capturing preparation operation started in response to production of the command 1 (sending thereof to the lens microcomputer 110) by the camera microcomputer 202. S21 represents that the command S2 is produced (and sent to the lens microcomputer 110) by the camera microcomputer 202 at T42. Td1 represents an image capturing exposure time (T42 to T43) of the image sensor 201 (image capturing time; hereinafter referred to as "an exposure time") started in response to production of the command S2. The lens microcomputer 110 starts, as illustrated by Th1, the display of the display information on the display element 112 at T41 and then continues the display for the first predetermined time to T43, that is, for the exposure time (T42 to T43).

S22 represents a long exposure time (Td1 from T42 to T44) extended due to continuous production of the command S2 (continuous sending thereof to the lens microcomputer 110) for a longer time than that of S21. In this case, the lens microcomputer 110 starts, as illustrated by Th2, the display of the display information on the display element 112 at T41 and then continues the display for a longer first predetermined time to T44, that is, for the exposure time (T42 to T44).

As just described, the lens microcomputer 110 controls, in the VF still image capturing mode, so as to maintain the display of the display information on the display element 112 for the first predetermined time corresponding to the exposure time from the start to end of the exposure. The first predetermined time is variable depending on the exposure time.

FIG. 5 illustrates a timing chart in a case where the display control process for the display element 112 is performed while the contents of the display information (focal length, object distance, depth of field and others) are changed at arbitrary times in response to the operations of the display switch 119 provided in the interchangeable lens 100. FIG. 5 further illustrates a timing chart in a case where the display of the display information on the display element 112 is continued during the operation of the lens operation member.

SW5 represents that the display switch 119 are operated twice at two times (T51 and T53). This twice-operation (first and second operations) changes the content of the display information displayed on the display element 112 twice. In this case, the lens microcomputer 110 continues the display of the display information for a period of time (display time from T51 to T54') illustrated as Th51 while changing the content of the display information. That is, the lens microcomputer 110 continues the display of the display information for a second predetermined time (fixed time) in response to the first operation of the display switch 119 as a trigger.

Th52 represents that the lens microcomputer 110 having detected the operation (Ts1) of the lens operation member at T54 during the display time Th51 (T51 to T54') of the display information on the display element 112 continues, from an end time (T55) of the operation, the display of the display information on the display element 112 for the second predetermined time (T55 to T56).

Accordingly, in the case illustrated in FIG. 5, the display of the display information on the display element 112 is continued from the start thereof (T51) to a time (T56) at which the second predetermined time elapses after the end of the operation of the lens operation member at T55.

The second predetermined time in FIG. 5 is desirable to be set to, for example, approximately 15 seconds, and however may be set to other times. The first and second predetermined times may be set variably by a use's operation.

On the other hand, at S208 in FIG. 2, the lens microcomputer 110 performs the second control to continue the display of the display information on the display element 112 until receipt of a display stop trigger (specific notice) from the camera microcomputer 202 at S209. The display stop trigger from the camera microcomputer 202 is, for example, notice indicating that the camera 200 is powered off or notice indicating that the camera 200 enters into its power-save mode.

The lens microcomputer 110 having determined at S209 that it has not received the display stop trigger returns to S204 to determine the set image capturing mode again. If the set image capturing mode is the LV still image capturing mode, the lens microcomputer 110 proceeds to s208 again. Thus, in the LV still image capturing mode and the moving image capturing mode, the lens microcomputer 110 continues the display of the display information on the display element 112 until receipt of the display stop trigger from camera microcomputer 202.

Figure 6:
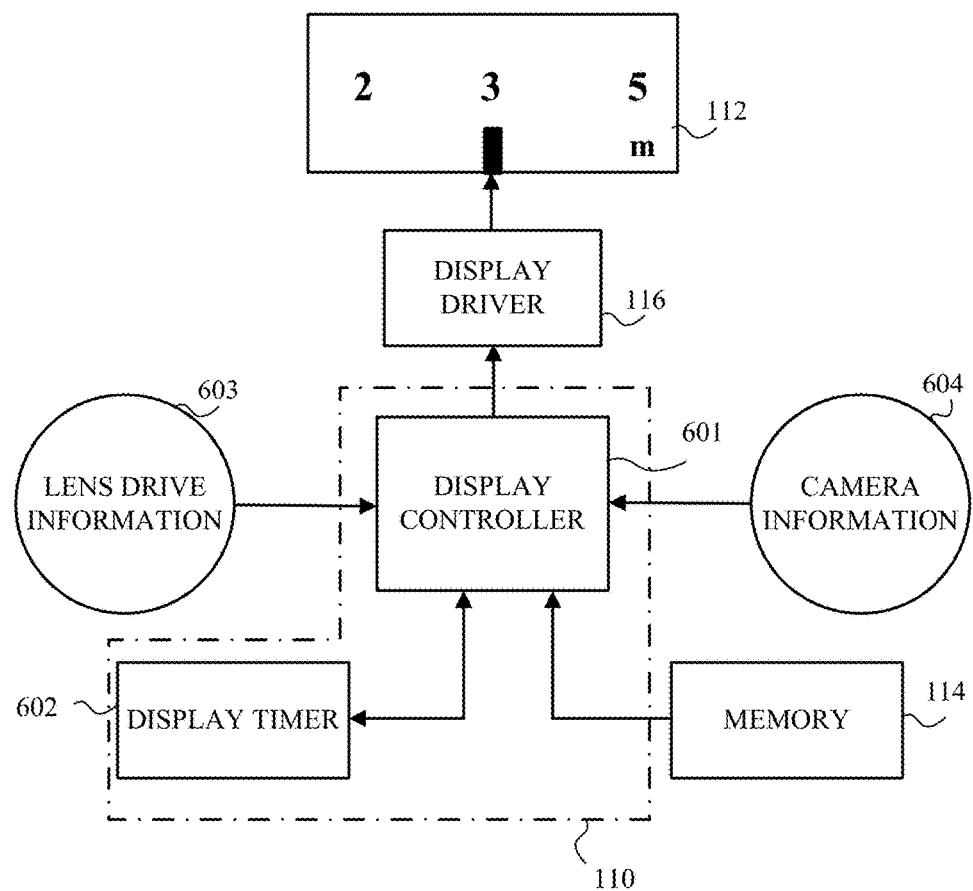
FIG. 6 is a block diagram illustrating a display control configuration in the interchangeable lens of Embodiment 1.

FIG. 6 illustrates a configuration relating to the display control of the display element 112. A display controller 601 in the lens microcomputer 110 acquires camera information 604 through communication with the camera 200. The camera information 604 includes information on the set image capturing mode, information (commands S1 and S2) indicating the operation of the image capturing switch 213, information on the exposure time of the image sensor 201, information on times at which display on the backside monitor 204 is performed and other information.

Furthermore, the display controller 601 acquires lens drive information 603. The lens drive information 603 includes information on the number of the drive pulse signals applied to the focus motor (stepping motor) 105 in the focus driver 107, information on rotation positions of the focus operation ring 118 and the zoom operation ring 109, information on an operation position of the focus mode selecting switching 117 and other information.

Moreover, the display controller 601 reads out the object distance, the focal length and the F-number from the data stored in the memory 114 and indicating the correspondence relations between the focus position and the object distance, between the zoom position and the focal length and between the aperture stop position and the F-number. In addition, the display controller 601 acquires data of the various display symbols to be displayed on the display element 112, which are stored in the memory 114. The display controller 601 processes or combines these data or performs calculations using these data to display, through the display driver 116, the display information including the object distance, the focal length, the depth of field and others on the display device 112.

The lens microcomputer 110 includes a display timer 602 that counts the elapsed time from the start of the display of the display information on the display element 112. The display controller 601 uses a count value obtained from the display timer 602 to perform the display control process illustrated by the flowchart of FIG. 2. The display controller 601 detecting the operation of the lens operation member during the count of the elapsed time resets the count value of the display timer 602 and then newly starts the count of the elapsed time.

As described above, the lens microcomputer 110 in this embodiment performs, as the display control for controlling the turning on and off of the display of the display information on the display element 112, mutually different controls depending on the set image capturing mode in the camera 200. Specifically, the lens microcomputer 110 sets different display times for which the display information is displayed on the display element 112 depending on the set image capturing mode.

In more detail, the lens microcomputer 110 starts the display of the display information on the display element 112 in response to the display trigger and then turns off the display of the display information in response to the elapse of the first predetermined time. The display trigger is the notice indicating the start of the image capturing preparation operation. The first predetermined time may be variable depending on the exposure time or fixed. Controlling the turning on and off of the display of the display information on the display element 112 in the VF still image capturing mode as described above achieves power saving.

On the other hand, in the LV still image capturing mode and the moving image capturing mode, the lens microcomputer 110 starts the display of the display information on the display element 112 in response to the display trigger different from that in the VF still image capturing mode and then continues the display thereof until the receipt of the display stop trigger. Therefore, this embodiment enables performing display controls for the display element 112 appropriate for the LV still and moving image capturing modes.

This embodiment described the case of controlling the turning on and off of the display of the display information on the display element 112 depending on the set image capturing mode. An alternative embodiment may acquire, in addition to performing the above display control, information on a state of the backside monitor 204 provided to the camera 200 to control the turning on and off of the display of the display information on the display element 112 in synchronization with start and stop of display of the backside monitor 204.

Embodiment 2

Figure 3:
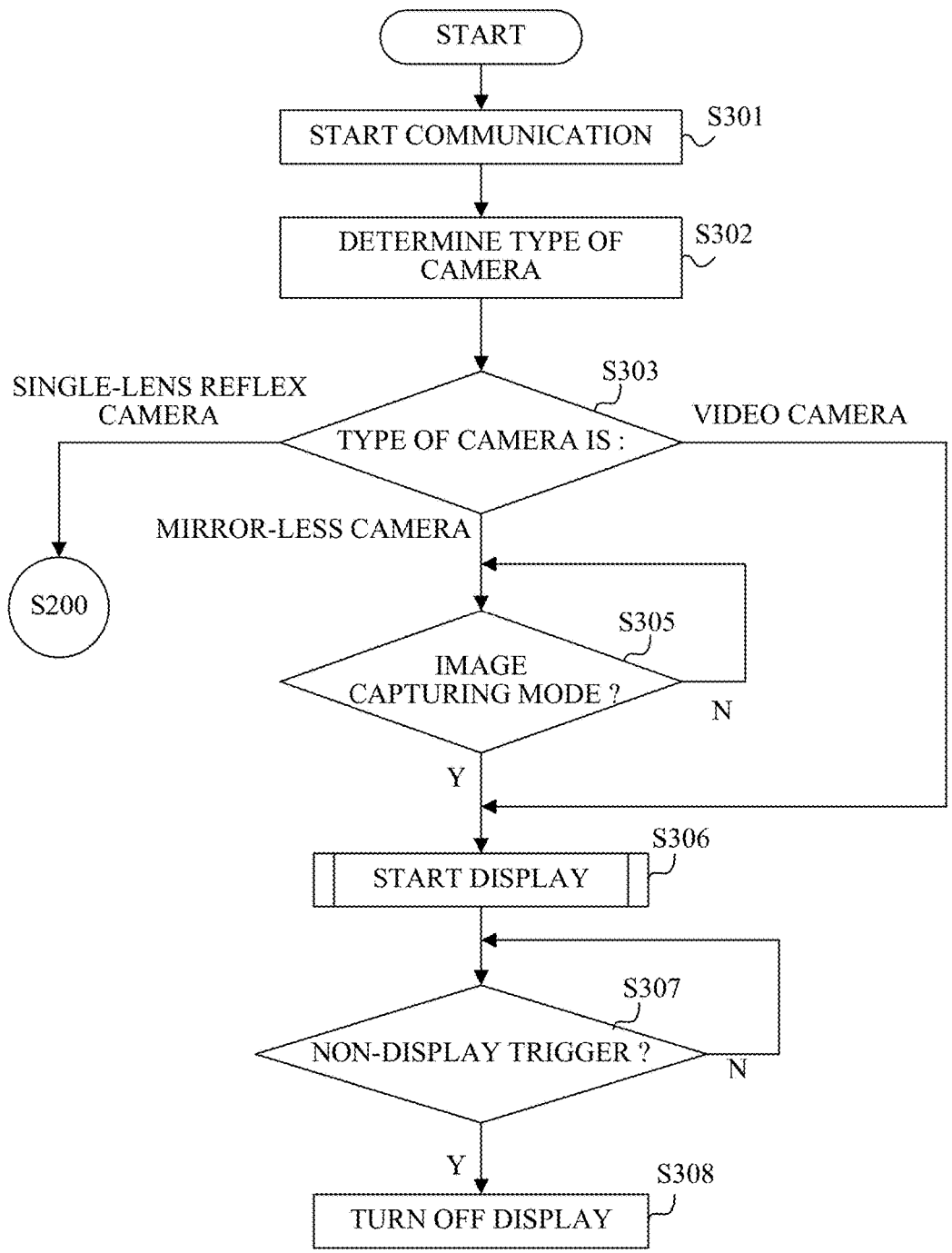
FIG. 3 is a flowchart of a display control process performed in an interchangeable lens that is Embodiment 2 of the present invention.

FIG. 3 illustrates a flowchart of a display control process performed in an interchangeable lens that is a second embodiment (Embodiment 2) of the present invention. This embodiment determines a type of a camera to which the interchangeable lens is attached and performs, depending on a result of the determination, the display control process described in Embodiment 1 or another display control process. A configuration of the interchangeable lens of this embodiment is identical to that of the interchangeable lens of Embodiment 1, and therefore constituent elements in this embodiment common to those in Embodiment 1 are denoted by the same reference numerals as those in Embodiment 1.

In response to connection of power supply pins and communication pins provided in mounts of a camera 200 and the interchangeable lens 100 attached thereto, a lens microcomputer 110 starts at S301 communication with a camera microcomputer 202.

Next, at S302, the lens microcomputer 110 receives camera information as an initial communication from the camera microcomputer 202 and determines, by using identification information included in the camera information, the type of the camera 200 to which the interchangeable lens 100 is attached (the camera is hereinafter referred to as "a lens-attached camera"). The lens microcomputer 110 in this embodiment determines whether the type of the lens-attached camera 200 is a single-lens reflex camera having an optical viewfinder, a mirror-less camera having no mirror 209 illustrated in FIG. 1 (that is, no optical viewfinder) or a video camera used only for moving image capturing. If the lens-attached camera 200 is the single-lens reflex camera having the optical viewfinder, the lens microcomputer 110 proceeds to S200 to perform the display control process described by using FIG. 2 in Embodiment 1, which includes the first to fourth controls, a mode-dependent control (S204, S205 and S208) and a first display start control (S203, S205 and S208). If the lens-attached camera 200 is the mirror-less camera (if receiving notice indicating that the mirror-less camera is powered on therefrom), the lens microcomputer 110 proceeds to S305. If the lens-attached camera 200 is the video camera, the lens microcomputer 110 proceeds to S306.

At S305, the lens microcomputer 110 determines whether the mirror-less camera is in an image capturing mode or a reproducing mode. If the mirror-less camera is in the image capturing mode that enables image capturing, the lens microcomputer 110 proceeds to S306 to start display of the display information described in Embodiment 1 on a display element 112 and then proceeds to S307. If the mirror-less camera is in the reproducing mode (non-image capturing mode) that disables the image capturing, the lens microcomputer 110 repeats the determination at S305 until the mirror-less camera is set to the image capturing mode. When the lens-attached camera 200 is the mirror-less camera, the lens microcomputer 110 may always turn on the display of the display information on the display element 112.

The lens microcomputer 110 having determined at S303 that the lens-attached camera 200 is the video camera (in other words, when receiving notice indicating that the video camera is powered on therefrom) proceeds to S306 to perform a second display start control, that is, to start the display of the display information on the display element 112, regardless of whether the video camera is in the image capturing mode or the reproducing mode. Then, the lens microcomputer 110 proceeds to S307.

At S307, the lens microcomputer 110 determines whether or not having received a display stop trigger from the camera microcomputer 202. If having received the display stop trigger, the lens microcomputer 110 performs a display stop control, that is, turns off the display of the display information on the display element 112. The display stop trigger in this embodiment is, for example, notice indicating that the lens-attached camera 200 is powered off and notice indicating that the lens-attached camera 200 is switched in its mode from the image capturing mode to the reproducing mode. If not having received the display stop trigger, the lens microcomputer 110 repeats the determination at S307 and continues the display of the display information on the display element 112 during the repetition of the determination.

As described above, this embodiment determines the type of the lens-attached camera and therefore enables performing a display control for the display element 112 appropriate for the type of the lens-attached camera.

Although the above embodiments described the interchangeable lens as one of accessories, display controls similar to those described in Embodiments 1 and 2 may be performed on other accessories detachably attachable to cameras and having a display element, such as an external flash.

Furthermore, as described in Embodiment 1, the information (display information) displayed on the display element 112 includes the information on the image capturing distance and the object distance, the information on the focal length, the information on the aperture value and the depth of field and others. Contents (kinds) of the display information displayed on the display element 112 are selectable through the operations of the display switch 119.

Moreover, depending on the display information displayed on the display element 112, a period of time (display duration) during which the display of the display information on the display element 112 is continued may be changed. For example, a display duration for the information on the image capturing distance or the object distance may be longer than that for the other information.

Furthermore, a number of times of the display of each kind of the display information or a display time for which each kind of the display information is displayed may be stored to the memory 114, and the display duration may be changed depending on the number of times of the display or the display time.

In addition, the lens microcomputer 110 may determine whether or not a handheld camera or a tripod-fixed camera is used for image capturing and may change the display duration depending on a result of the determination. For example, when the tripod-fixed camera is used, its user is likely to frequently check the display information on the display element 112, so that it is desirable to set a long display duration.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-76830, filed Apr. 3, 2015 and 2016-032171, filed Feb. 23, 2016, which are hereby incorporated by reference herein in their entirety.

What is claimed is:

1. An image capturing lens interchangeable to a camera in which an image capturing mode is settable, the image capturing lens comprising:
    an optical system;
    a display element configured to electrically display information related to an image capturing condition; and
    a controller configured to control the display element so that a consumption of electric power in the display element when the set image capturing mode is a first image capturing mode in which an image is capturable by the camera is different from a consumption of electric power in the display element when the set image capturing mode is a second image capturing mode in which an image is capturable by the camera different from the first image capturing mode.

2. The image capturing lens according to claim 1, wherein the controller differentiates consumption of electric power in the display element by differentiating a display time of the information displayed on the display element when the set image capturing mode is the first image capturing mode from the display time of the information displayed on the display element when the set image capturing mode is the second image capturing mode.

3. The image capturing lens according to claim 2, wherein the controller differentiates the display time of the information displayed on the display element by differentiating a timing to stop displaying the information displayed on the display element when the set image capturing mode is the first image capturing mode from a timing to stop displaying the information displayed on the display element when the set image capturing mode is the second image capturing mode.

4. The image capturing lens according to claim 3, wherein when the set image capturing mode is the first image capturing mode, the controller stops displaying the information after a predetermined time elapses from when the controller starts displaying the information on the display element.

5. The image capturing lens according to claim 3, wherein when the set image capturing mode is the second image capturing mode, the controller stops displaying the information on the display element in response to receipt from the camera of a notice indicating that the camera is powered off or a notice indicating that the camera is in a power-save mode.

6. The image capturing lens according to claim 2, wherein the controller differentiates the display time of the information displayed on the display element by differentiating a timing to start displaying the information on the display element when the set image capturing mode is the first image capturing mode from a timing to start displaying the information on the display element when the set image capturing mode is the second image capturing mode.

7. The image capturing lens according to claim 6, wherein when the set image capturing mode is the first image capturing mode, the controller starts displaying the information on the display element in a response to receipt of a notice indicating that an image capturing preparation operation or an image capturing operation is started in the camera.

8. The image capturing lens according to claim 6, wherein when the set image capturing mode is the second image capturing mode, the controller starts displaying the information on the display element in a response to receipt of a notice indicating that the second image capturing mode is set in the camera.

9. The image capturing lens according to claim 1, wherein the first image capturing mode is an image capturing mode for performing still image capturing using an optical finder, and the second image capturing mode is an image capturing mode for performing still image capturing using an electronic monitor or for performing moving image capturing.

10. The image capturing lens according to claim 1, wherein the controller controls the display element so that the consumption of electric power in the display element when a tripod-fixed camera is not used is different from the consumption of electric power in the display element when the tripod-fixed camera is used.

11. The image capturing lens according to claim 10, wherein the controller controls the display element so that a display time of the information displayed on the display element when the tripod-fixed camera is used is longer than the display time of the information displayed on the display element when the tripod-fixed camera is not used.

12. The image capturing lens according to claim 1, wherein the displayed information includes a focal length.

13. The image capturing lens according to claim 1, wherein the displayed information has multiple types of information, and the controller controls the display element so that the consumption of electric power in the display element differs depending on the type of the information being displayed.

14. An image capturing lens interchangeable to a camera comprising:
    an optical system;
    a display element configured to electrically display information related to an image capturing condition; and
    a controller configured to control the display element so that a consumption of electric power in the display element when the image capturing lens is attached to a first camera body of a first type camera is different from a consumption of electric power in the display element when the image capturing lens is attached to a second camera body of a second type camera different from the first type camera, the first camera body being a different camera body than the second camera body.

15. The image capturing lens according to claim 14, wherein the controller differentiates consumption of electric power in the display element by differentiating a timing to start displaying the information on the display element when the type of the camera is a camera which has an optical finder from a timing to start displaying the information on the display element when the type of the camera is a camera which does not have an optical finder.

16. The image capturing lens according to claim 15, wherein when the type of the camera is a camera which has an optical finder, after the controller receives a notice indicating that the camera which has the optical finder is in an image capturing mode and a notice indicating a type of an image capturing mode set in the camera which has the optical finder, the controller starts displaying the information at a timing depending on the type of the image capturing mode set in the camera which has the optical finder.

17. The image capturing lens according to claim 15, wherein when the type of the camera is a camera which does not have an optical finder, the controller starts displaying the information on the display element in response to receipt of a notice indicating the camera which does not have the optical finder is powered on.

18. The image capturing lens according to claim 14, wherein the controller controls the display element so that the consumption of electric power in the display element when a tripod-fixed camera is not used is different from the consumption of electric power in the display element when the tripod-fixed camera is used.

19. The image capturing lens according to claim 18, wherein the controller controls the display element so that a display time of the information displayed on the display element when the tripod-fixed camera is used is longer than the display time of the information displayed on the display element when the tripod-fixed camera is not used.

20. The image capturing lens according to claim 14, wherein the displayed information includes a focal length.

21. The image capturing lens according to claim 14, wherein the displayed information has multiple types of information, and the controller controls the display element so that the consumption of electric power in the display element differs depending on the type of the information being displayed.

22. A non-transitory computer-readable storage medium storing a display control program as a computer program to cause a computer of an image capturing lens to operate, the image capturing lens being interchangeable to a camera and comprising a display element to electrically display information, the program causing the computer to:
control the display element so that a consumption of electric power in the display element when an image capturing mode set in the camera is a first image capturing mode in which an image is capturable by the camera is different from a consumption of electric power in the display element when an image capturing mode set in the camera is a second image capturing mode in which an image is capturable by the camera different from the first image capturing mode.

23. A non-transitory computer-readable storage medium storing a display control program as a computer program to cause a computer of an image capturing lens to operate, the image capturing lens being interchangeable to a camera and comprising a display element to electrically display information, the program causing the computer to:
control the display element so that a consumption of electric power in the display element when the image capturing lens is attached to a first camera body of a first type camera is different from a consumption of electric power in the display element when the image capturing lens is attached to a second camera body of a second type camera different from the first type camera, the first camera body being a different camera body than the second camera body.

* * * * *